United States Patent
Lee (10) Patent No.: US 12,025,452 B2
(45) Date of Patent: Jul. 2, 2024

(54) DEVICE, METHOD, AND SYSTEM OF GUIDING VEHICLE TO HYDROGEN FILLING STATION

(71) Applicants: Hyundai Motor Company, Seoul (KR); Kia Corporation, Seoul (KR)

(72) Inventor: Tae Ho Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 387 days.

(21) Appl. No.: 17/475,502

(22) Filed: Sep. 15, 2021

(65) Prior Publication Data

US 2022/0349723 A1    Nov. 3, 2022

(30) Foreign Application Priority Data

Apr. 30, 2021    (KR) .......... 10-2021-0056261

(51) Int. Cl.
  *G01C 21/34*    (2006.01)
  *G01C 21/36*    (2006.01)
(52) U.S. Cl.
  CPC ..... *G01C 21/3476* (2013.01); *G01C 21/3697* (2013.01)

(58) Field of Classification Search
  CPC .................. G01C 21/3476; G01C 21/3697
  See application file for complete search history.

(56) References Cited

U.S. PATENT DOCUMENTS

| | | | | |
|---|---|---|---|---|
| 10,856,104 | B2* | 12/2020 | Sakurada | H04W 4/021 |
| 11,411,234 | B2* | 8/2022 | Fujita | H01M 8/04201 |
| 2020/0178024 | A1* | 6/2020 | Sakurada | G08G 1/0129 |
| 2021/0143458 | A1* | 5/2021 | Fujita | H01M 8/04992 |

* cited by examiner

*Primary Examiner* — Khoi H Tran
*Assistant Examiner* — Aaron G Cain
(74) *Attorney, Agent, or Firm* — Fox Rothschild LLP (57) ABSTRACT

A guide system for selecting from among a plurality of hydrogen filling stations includes a first communication device to receive information on a status of a hydrogen fuel dispenser from each of the plurality of hydrogen filling stations, respectively; a second communication device to receive a request for guidance to one of the hydrogen filling stations, from a vehicle terminal; and a controller to guide a hydrogen fuel vehicle having the vehicle terminal to a selected one of the hydrogen filling stations allowing the hydrogen fuel vehicle to occupy a hydrogen fuel dispenser having reference pressure, at a time point when the hydrogen fuel vehicle arrives, such that the hydrogen fuel vehicle is guided to the optimal hydrogen filling station to immediately fill hydrogen without standby time.

22 Claims, 4 Drawing Sheets

DEVICE, METHOD, AND SYSTEM OF GUIDING VEHICLE TO HYDROGEN FILLING STATION

CROSS-REFERENCE TO RELATED APPLICATION

This application claims under 35 U.S.C. § 119(a) the benefit of Korean Patent Application No. 10-2021-0056261, filed in the Korean Intellectual Property Office on Apr. 30, 2021, the entire contents of which are incorporated herein by reference.

BACKGROUND

(a) Technical Field

The present disclosure relates to a device, method, and system of guiding a hydrogen vehicle to a selected one, i.e., an optimal one of a plurality of hydrogen filling stations.

(b) Description of the Related Art

In general, a vehicle having an internal combustion engine runs by rotation power generated as gasoline (i.e., a fossil fuel) and oxygen in the air are burnt, while a fuel cell vehicle runs by rotation power of an electromotor driven using electrical energy generated from a fuel cell stack.

The fuel cell stack, which is a power source of the fuel cell vehicle, generates electrical energy through an electrochemical reaction between hydrogen, which is supplied from a higher-pressure fuel tank in the vehicle, and oxygen in the air supplied by an air supply device.

In such a fuel cell vehicle, an important issue is to more safely and compactly store hydrogen serving as fuel. Accordingly, in general, the hydrogen is filled in a light and high-strength fuel tank withstanding higher pressure for use. In addition, to ensure a riding space and a sufficient driving distance, the hydrogen is filled in the fuel tank at higher pressure and used.

The fuel tank of the fuel cell vehicle typically has the specifications of 350 bar or 700 bar. A tank body is manufactured by using metal, such as an aluminum (Al) alloy, or plastic. To ensure sufficient pressure resistance, a reinforcing material, such as carbon fiber, is wound around an outer portion of the tank body.

Meanwhile, regarding a hydrogen fuel dispenser provided in a hydrogen filling station, hydrogen from a hydrogen tube is compressed and stored in a hydrogen tank (or cartridge), and the stored hydrogen in the hydrogen tank is supplied to a hydrogen fuel vehicle at the rate of 1 km per minute when the hydrogen fuel dispenser is connected with a hydrogen inlet.

When hydrogen filling in one hydrogen fuel vehicle is finished, such a hydrogen fuel dispenser has to perform the process of increasing the internal pressure of the hydrogen tank to reference pressure (for example, 700 bar) to fill hydrogen in another hydrogen fuel vehicle, because the internal pressure of the hydrogen tank is reduced in the process of supplying hydrogen to the hydrogen fuel vehicle (filling pressure is lowered). In this case, the process of increasing the internal pressure of the hydrogen tank requires about 20 minutes.

A conventional guide system to a hydrogen filling station guides a hydrogen fuel vehicle to the hydrogen filling station, based merely on a drivable distance depending on a remaining amount of hydrogen in the hydrogen fuel vehicle, a distance from a current position of the hydrogen fuel vehicle to the hydrogen filling station, and a price of hydrogen. Accordingly, the conventional guide system does not take into account an optimal hydrogen filling station.

The matter described in "Background" is made for the convenience of explanation, and may include matters other than a related art well known to those skilled in the art.

SUMMARY

An aspect of the present disclosure provides a guide system to a hydrogen filling station and a method for the same, capable of providing a guide to the optimal hydrogen filling station to immediately fill hydrogen in a hydrogen fuel vehicle without standby time, by guiding the hydrogen fuel vehicle to the hydrogen filling station positioned within a drivable distance of the hydrogen fuel vehicle and allowing the hydrogen fuel vehicle to occupy a hydrogen fuel dispenser having higher than reference pressure at a time point when the hydrogen fuel vehicle arrives.

The technical problems to be solved by the present disclosed are not limited to the aforementioned problems, and any other technical problems not mentioned herein will be clearly understood from the following description by those skilled in the art to which the present disclosure pertains. In addition, it can be easily understood that the objects and the features of the present disclosure are realized by means and the combination of the means claimed in appended claims.

According to an aspect of the present disclosure, a guide device for selecting from among a plurality of hydrogen filling stations may include a first communication device to receive information on a status of a hydrogen fuel dispenser from a plurality of hydrogen filling stations, a second communication device to receive a request for guidance to the one of the hydrogen filling stations, from a vehicle terminal, and a controller to guide a hydrogen fuel vehicle having the vehicle terminal to a selected one of the hydrogen filling stations allowing the hydrogen fuel vehicle to occupy a hydrogen fuel dispenser having reference pressure, at a time point when the hydrogen fuel vehicle arrives.

According to an embodiment of the present disclosure, the controller may provide a guide to a hydrogen filling station having a minimum filling time, among the plurality of hydrogen filling stations, which allow the hydrogen fuel vehicle to occupy the hydrogen fuel dispenser corresponding to the reference pressure, are provided.

According to an embodiment of the present disclosure, the controller may receive pressure of a fuel tank from the vehicle terminal through the second communication device, and may calculate filling time based on current pressure, which is included in the information on the status of the hydrogen fuel dispenser, of a hydrogen tank and the received pressure of the fuel tank.

According to an embodiment of the present disclosure, the controller may periodically update information on a status of the hydrogen fuel dispenser, which is stored in a storage.

According to an embodiment of the present disclosure, the information on the status of the hydrogen fuel dispenser may include at least one of maximum pressure of a hydrogen tank, current pressure of the hydrogen tank, a current status (a hydrogen-filling status, a status of boosting pressure of the hydrogen tank, or a hydrogen filling standby status) of the hydrogen tank, expected time required until hydrogen is fully filled, expected pressure of the hydrogen tank after the hydrogen is fully filled, or expected time required to boost the pressure of the hydrogen tank to the reference pressure after the hydrogen is fully filled in the hydrogen-filling status, or expected time required to boost the pressure of the hydrogen tank to the reference pressure, or expected pressure of the hydrogen tank after the pressure of the hydrogen tank is completely boosted in the status of boosting pressure of the hydrogen tank.

According to an embodiment of the present disclosure, the controller may provide a guide to a hydrogen filling station, which is positioned within the drivable distance of the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to an embodiment of the present disclosure, the controller may provide a guide to a hydrogen filling station, which has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to an embodiment of the present disclosure, the controller may provide a guide to a hydrogen filling station, which is positioned within a drivable distance of the hydrogen fuel vehicle and has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to an aspect of the present disclosure, a guide method for selecting from among a plurality of hydrogen filling stations, may include receiving, by a first communication device, information on a status of a hydrogen fuel dispenser from a plurality of hydrogen filling stations, receiving, by a second communication device, a request for guidance to one of the hydrogen filling stations, from a vehicle terminal, and guiding, by a controller, a hydrogen fuel vehicle having the vehicle terminal to a selected one of the hydrogen filling stations allowing the hydrogen fuel vehicle to occupy a hydrogen fuel dispenser having reference pressure, at a time point when the hydrogen fuel vehicle arrives.

According to an embodiment of the present disclosure, the guide method may include providing a guide to a hydrogen filling station having a minimum filling time, among the plurality of hydrogen filling stations, which allow the hydrogen fuel vehicle to occupy the hydrogen fuel dispenser corresponding to the reference pressure, are provided.

According to an embodiment of the present disclosure, the guide method may include receiving, by the second communication, pressure of a fuel tank from the vehicle terminal, and calculating, by the controller, filling time based on current pressure, which is included in the information on the status of the hydrogen fuel dispenser, of a hydrogen tank and the received pressure of the fuel tank.

According to an embodiment of the present disclosure, the guide method may include providing a guide to a hydrogen filling station, which is positioned within the drivable distance of the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to an embodiment of the present disclosure, the guide method may include providing a guide to a hydrogen filling station, which has a hydrogen fuel dispenser linked with a hydrogen tank having the pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to an embodiment of the present disclosure, the guide method may include providing a guide to a hydrogen filling station, which is positioned within a drivable distance of the hydrogen fuel vehicle and has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to another aspect of the present disclosure, a guide system for selecting from among a plurality of hydrogen filling stations, may include a hydrogen filling station to collect information on a status of a hydrogen fuel dispenser, a vehicle terminal to requesting guidance to the hydrogen filling station, and a guide device to guide a hydrogen fuel vehicle having the vehicle terminal to a selected one of the hydrogen filling stations allowing the hydrogen fuel vehicle to occupy a hydrogen fuel dispenser having reference pressure, at a time point when the hydrogen fuel vehicle arrives.

According to an embodiment of the present disclosure, the guide device may provide a guide to a hydrogen filling station having a minimum filling time, among the plurality of hydrogen filling stations, which allow the hydrogen fuel vehicle to occupy the hydrogen fuel dispenser having the reference pressure, are provided.

According to an embodiment of the present disclosure, the guide device may receive pressure of a fuel tank from the vehicle terminal, and calculate filling time based on current pressure, which is included in the information on the status of the hydrogen fuel dispenser, of a hydrogen tank and the received pressure of the fuel tank.

According to an embodiment of the present disclosure, the guide device may provide a guide to a hydrogen filling station, which has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to an embodiment of the present disclosure, the guide device may provide a guide to a hydrogen filling station, which is positioned within a drivable distance of the hydrogen fuel vehicle and has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

According to another aspect of the present disclosure, a guide device for selecting from among a plurality of hydrogen filling stations may include a first communication device to receive maximum pressure and current pressure of a hydrogen tank from each hydrogen filling station, a second communication device to receive maximum pressure and current pressure of a fuel tank from a vehicle terminal, and a controller to calculate filling time for each hydrogen filling station, based on the maximum pressure and the current pressure of the hydrogen tank provided in the each hydrogen filling station and the maximum pressure and the current pressure of the fuel tank, depending on a guide request of the vehicle terminal.

According to an embodiment of the present disclosure, the controller may provide the hydrogen filling station having the minimum filling time, at a time point when a hydrogen fuel vehicle having the vehicle terminal arrives.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

According to an embodiment of the present disclosure, a fuel tank refers to a tank provided in a hydrogen fuel vehicle, and a hydrogen tank refers to a tank provided in a hydrogen filling station.

Figure 1:
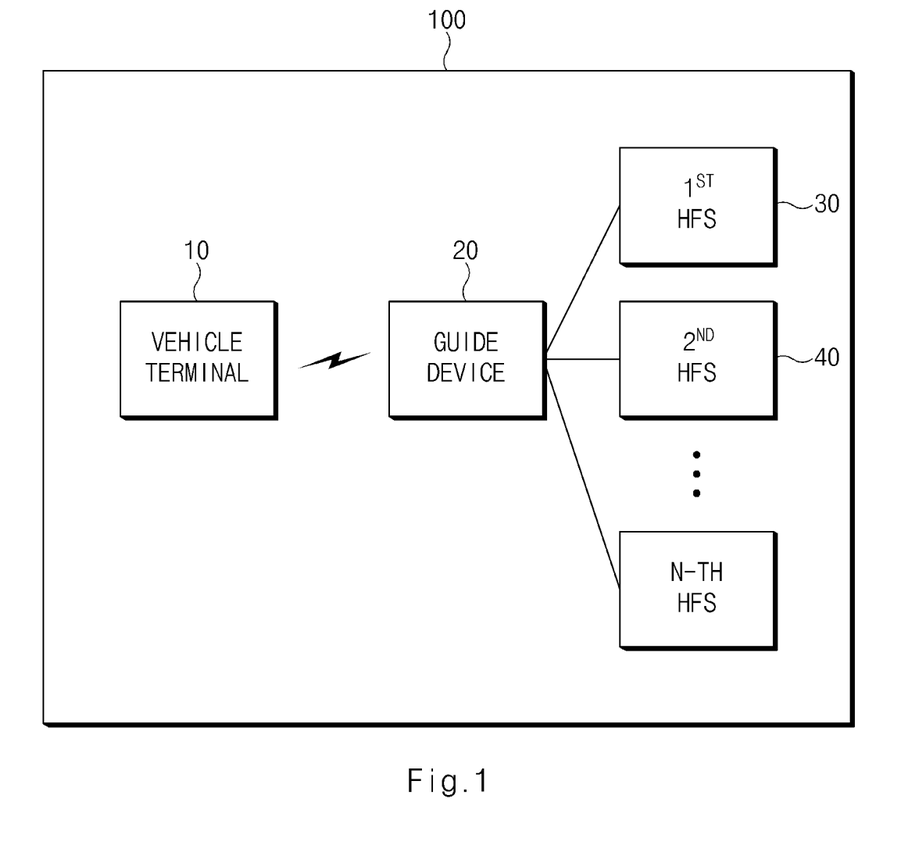
FIG. 1 is a view illustrating the configuration of a guide system to a hydrogen filling station, according to an embodiment of the present disclosure.

FIG. 1 is a view illustrating the configuration of a guide system to a hydrogen filling station, according to an embodiment of the present disclosure.

As illustrated in FIG. 1, according to an embodiment of the present disclosure, a guide system 100 for selecting from among a plurality of hydrogen filling stations (i.e., providing guidance to a vehicle to an optimal hydrogen filling state among the plurality of hydrogen filling stations) may include a vehicle terminal 10, a guide device 20, a first hydrogen filling station 30, and a second hydrogen filling station 40. Although two hydrogen filling stations are employed by way of example for the convenience of explanation, the present disclosure is not limited to the number of hydrogen filling stations.

Regarding the components in the guide system 100, the vehicle terminal 10, which is provided in the hydrogen fuel vehicle, may be implemented, for example, in the form of a telematics terminal.

The vehicle terminal 10 may collect various pieces of information from the hydrogen fuel vehicle and may request the guide device 20 to provide a guide to the optimal hydrogen filling station, based on the collected information. In this case, the various information may include, for example, the maximum pressure of a fuel tank provided in the hydrogen fuel vehicle, the current pressure of the fuel tank, the current position (e.g., a GPS position) of the hydrogen fuel vehicle, a navigation destination (an address, a building name, or a government office), a drivable distance of the hydrogen fuel vehicle, and a priority for the guide to the hydrogen filling station.

In this case, the maximum pressure of the fuel tank, which is fixed information (default information), may be obtained from an electronic control unit (ECU) provided in the hydrogen fuel vehicle. The current pressure of the fuel tank and the drivable distance of the hydrogen fuel vehicle may obtained from a fuel cell-energy management system (FC-EMS) provided in the hydrogen fuel vehicle. The current position and the navigation destination of the hydrogen fuel vehicle may be obtained from a navigation device provided in the hydrogen fuel vehicle. The priority for the guide to the hydrogen filling station, which includes a buffering priority, a short-distance priority, or a price priority, may be obtained, as a user selects one from the buffering priority, the short-distance priority, or the price priority. In addition, the priority for the guide to the hydrogen filling station may further include an item for a partial filling priority, and the item for the partial filing priority may include a time (filling time) required for filling hydrogen and pressure of a hydrogen tank.

The vehicle terminal 10 may be connected with the guide device 20 to provide the various information, and may request (guide request) the guide device 20 to provide the guide to the optimal hydrogen filling station corresponding to the various information. In this case, the information provided to the guide device 20 by the vehicle terminal 10 is shown in the following table 1 by way of example

TABLE 1

| Classification | Hydrogen fuel vehicle |
| --- | --- |
| Maximum pressure of fuel tank | 500 Bar |
| Current pressure of fuel tank | 200 Bar |
| Current position of hydrogen fuel vehicle | Seoul Jongno-gu Office |
| Destination of hydrogen fuel vehicle | Seoul National Museum |
| Drivable distance of hydrogen fuel vehicle | 100 km |
| User guide priority | Buffering priority |

Table 1 shows the case that the user selects the buffering priority.

The guide device 20 may provide the guide to a hydrogen filling station, which allows the hydrogen fuel vehicle to occupy a hydrogen fuel dispenser linked with a hydrogen tank having reference pressure (for example, 700 bar, 350 bar, or pressure required to fill the fuel tank provided in the hydrogen fuel vehicle), at a time point when the hydrogen fuel vehicle having the vehicle terminal 10 arrives, depending on the guide request from the vehicle terminal 10. In this case, a plurality of hydrogen filling stations may be provided. A plurality of hydrogen fuel dispensers may be provided in each hydrogen filling station, and each hydrogen fuel dispenser may individually have a hydrogen tank (or cartridge).

When a plurality of hydrogen filling stations, which allow the hydrogen fuel vehicle to occupy a hydrogen fuel dispenser corresponding to reference pressure, are present, the guide device 20 may provide a guide to a hydrogen filling station showing the minimum filling time. In this case, the guide device 20 may receive pressure of the fuel tank from the vehicle terminal 10, and may calculate the filling time based on the current pressure of the hydrogen tank, which is included in the information on the status of the hydrogen fuel dispenser and the received pressure of the fuel tank. In this case, the guide device 20 may calculate the filling time, based on the current pressure of the hydrogen tank and the pressure of the fuel tank at the time point when the hydrogen fuel vehicle having the vehicle terminal 10 arrives.

The guide device 20 may provide a guide to a hydrogen filling station, which is positioned within the drivable distance of the hydrogen fuel vehicle, of the hydrogen filling stations, which allow the hydrogen fuel vehicle to occupy a hydrogen fuel dispenser linked with a hydrogen tank having reference pressure, at a time point when the hydrogen fuel vehicle having the vehicle terminal 10 arrives, depending on the guide request of the vehicle terminal 10.

The guide device 20 may provide a guide to a hydrogen filling station, which has a hydrogen fuel dispenser linked with a hydrogen tank having pressure higher than the pressure of the fuel tank provided in the hydrogen fuel vehicle, of the hydrogen filling stations, which allow the hydrogen fuel vehicle to occupy the hydrogen fuel dispenser linked with a hydrogen tank having the reference pressure, at a time point when the hydrogen fuel vehicle having the vehicle terminal 10 arrives, depending on the guide request of the vehicle terminal 10.

The guide device 20 may provide a guide to a hydrogen filling station, which is positioned within the drivable distance of the hydrogen fuel vehicle and has a hydrogen fuel dispenser linked with a hydrogen tank having pressure higher than the pressure of the fuel tank provided in the hydrogen fuel vehicle, of the hydrogen filling stations, which allow the hydrogen fuel vehicle to occupy the hydrogen fuel dispenser linked with a hydrogen tank having the reference pressure, at the time point when the hydrogen fuel vehicle having the vehicle terminal 10 arrives, depending on the guide request of the vehicle terminal 10.

The guide device 20 may periodically receive status information (position information, price information, and status information of each hydrogen fuel dispenser) of each of hydrogen filling stations 30 and 40 from the hydrogen filling stations 30 and 40. In this case, the status information of the hydrogen filling stations 30 and 40, which is received by the guide device 20, is the status information of the hydrogen fuel dispenser provided in the relevant hydrogen filling station. The status information may include the maximum pressure of the hydrogen tank, the current pressure of the hydrogen tank, a current status (a hydrogen-filling status, a status of boosting pressure of hydrogen tank, or a hydrogen filling standby status). In the status of filling the hydrogen, the status information may include expected time required until hydrogen is fully filled, expected pressure of the hydrogen tank after the hydrogen is fully filled, or expected time required to boost the pressure of the hydrogen tank to the reference pressure after the hydrogen is fully filled. In the status of boosting the pressure of hydrogen tank, the status information may include expected time required to boost the pressure of the hydrogen tank to the reference pressure, and the expected pressure of the hydrogen tank after the pressure of the hydrogen tank is completely boosted.

For example, the status information received from the first hydrogen filling station 30 is shown by way of example as in following table 2.

TABLE 2

| | Classification | First hydrogen filling station |
|---|---|---|
| Hydrogen filling station Information | Position of hydrogen filing station | Seoul City Hall |
| | Filling price | 8 dollars/kg |
| First hydrogen fuel dispenser | Maximum pressure of hydrogen tank | 700 Bar |
| | Current pressure of hydrogen tank | 200 Bar |
| | Current status | Hydrogen filling status |
| | Expected time required until hydrogen is fully filled | Four minutes |
| | Expected pressure of hydrogen tank after fully filling | 50 Bar |
| | Expected time required to boost pressure of hydrogen tank after fully filling | 20 minutes |
| Second hydrogen fuel dispenser | Maximum pressure of hydrogen tank | 700 Bar |
| | Current pressure of hydrogen tank | 500 Bar |
| | Current status | Status of boosting pressure of hydrogen tank |
| | Expected time required to boost the pressure of hydrogen tank | 10 minutes |
| | Expected pressure of hydrogen tank after completely boosting pressure | 600 Bar |

In table 2, the information on the first hydrogen fuel dispenser or the information on the second hydrogen fuel dispenser may further include the number of vehicles standing by and the total standby time at a current time point.

A terminal (not illustrated) provided in the first hydrogen filling station 30 may periodically collect price information of hydrogen, which is set by an owner, and status information on each hydrogen fuel dispenser, and may transmit the collected information to the guide device 20.

A terminal (not illustrated) provided in the second hydrogen filling station 40 may periodically collect price information of hydrogen, which is set by an owner, and status information on each hydrogen fuel dispenser, and may transmit the collected information to the guide device 20.

Meanwhile, the time (filling time) required to fill hydrogen in the fuel tank, which is provided in the hydrogen fuel vehicle, is decreased, as the hydrogen tank provided in the hydrogen filling station has higher pressure, and is increased, as the hydrogen tank provided in the hydrogen filling station has lower pressure. In this case, the hydrogen tanks provided in the hydrogen filling stations, respectively, may have mutually different maximum pressure, due to the difference in capacity between the hydrogen tanks provided in the hydrogen filling stations. In other words, the filling time may be varied depending on the maximum pressure and the current pressure of the hydrogen tank provided in each hydrogen filling station and the maximum pressure and the current pressure of the fuel tank provided in the hydrogen fuel vehicle.

Accordingly, the guide device 20 may calculate filling time with respect to each hydrogen filling station, based on the maximum pressure and the current pressure of the hydrogen tank provided in each hydrogen filling station and the maximum pressure and the current pressure of the fuel tank provided in the hydrogen fuel vehicle, and may provide the guide to a hydrogen filling station having the minimum filling time.

Figure 2:
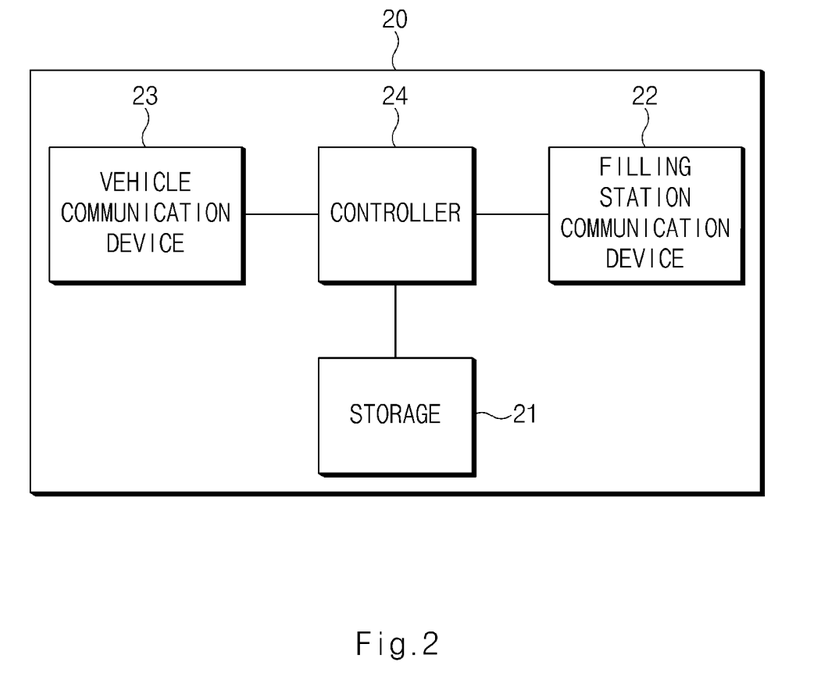
FIG. 2 is a view illustrating the detailed configuration of a guide device included in a guide system to a hydrogen filling station, according to an embodiment of the present disclosure.

FIG. 2 is a view illustrating the detailed configuration of a guide device included in a guide system to a hydrogen filling station, according to an embodiment of the present disclosure.

As illustrated in FIG. 2, the guide device 20 provided in the guide system to the hydrogen filling station according to an embodiment of the present disclosure may include a storage 21, a filling station communication device 22, a vehicle communication device 23, and a controller 24. In this case, according to an embodiment of the present disclosure, the components may be combined into each other to be implemented in one form, or some components may be omitted, depending on the manners of reproducing the guide system 100 to the hydrogen filling station. In particular, the filling station communication device 22 may be integrated with the vehicle communication device 23 and thus implemented in one communication module.

Regarding the components, the storage 21 may store various information (for example, information as in table 1) received from the hydrogen fuel vehicle and various information (for example, information as in table 2) received from each hydrogen filling station. In this case, the information received from each hydrogen filling station may be periodically updated.

The storage 21 may store various logics, various algorithms, and various programs required in the procedure of providing a guide to a hydrogen filling station, which allows the hydrogen fuel vehicle to occupy a hydrogen fuel dispenser linked with a hydrogen tank having reference pressure, at a time point when the hydrogen fuel vehicle having the vehicle terminal 10 arrives, depending on the guide request of the vehicle terminal 10.

The storage 21 may store various logics, various algorithms, and various programs required in the procedure of providing a guide to a hydrogen filling station, which is positioned within the drivable distance of the hydrogen fuel vehicle, of the hydrogen filling stations, which allow the hydrogen fuel vehicle to occupy a hydrogen fuel dispenser linked with a hydrogen tank having reference pressure, at a time point when the hydrogen fuel vehicle having the vehicle terminal 10 arrives, depending on the guide request of the vehicle terminal 10.

The storage 21 may store various logics, various algorithms, and various programs required in the procedure of providing a guide to a hydrogen filling station, which has a hydrogen fuel dispenser linked with a hydrogen tank having pressure higher than the pressure of the fuel tank provided in the hydrogen fuel vehicle, of the hydrogen filling stations, which allow the hydrogen fuel vehicle to occupy the hydrogen fuel dispenser linked with a hydrogen tank having the reference pressure, at a time point when the hydrogen fuel vehicle having the vehicle terminal 10 arrives, depending on the guide request of the vehicle terminal 10.

The storage 21 may store various logics, various algorithms, and various programs required in the procedure of providing a guide to a hydrogen filling station, which is positioned within the drivable distance of the hydrogen fuel vehicle and has a hydrogen fuel dispenser linked with a hydrogen tank having pressure higher than the pressure of the fuel tank provided in the hydrogen fuel vehicle, of the hydrogen filling stations, which allow the hydrogen fuel vehicle to occupy the hydrogen fuel dispenser linked with a hydrogen tank having the reference pressure, at the time point when the hydrogen fuel vehicle having the vehicle terminal 10 arrives, depending on the guide request of the vehicle terminal 10.

The storage 21 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The filling station communication device 22, which is a module to provide a communication interface with a terminal (not illustrated) provided in each hydrogen filling station, may receive the status information of the hydrogen filling station in real time. In this case, the filling station communication device 22 may be referred to as a first communication device.

The vehicle communication device 23, which is a module to provide a communication interface with the vehicle terminal 10 provided in each hydrogen fuel vehicle, may receive status information (for example, the pressure of the fuel tank) of the hydrogen fuel vehicle, from the vehicle terminal 10. In other words, the vehicle communication device 23 may receive the request for the guide to the hydrogen filling station, from the vehicle terminal 10. In this case, the vehicle communication device 23 may be referred to as a second communication device.

The vehicle communication device 23 may include at least one of a mobile communication module, a wireless Internet module, or a short-range communication module.

The mobile communication module may make communication over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTEA), 4th Generation mobile telecommunication (4G), or 5th Generation mobile telecommunication (5G).

The wireless Internet module, which is a module for wireless Internet access, may make communication through Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may support short-range communication through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

The controller 24 may perform the overall control such that the components normally perform the respective functions. In addition, the controller 24 may be implemented in the form of hardware or software, and may be implemented in the form of the combination of the hardware and the software. Preferably, the controller 24 may be implemented with a micro-processor, but the present disclosure is not limited thereto.

The controller 24 may perform various control operations in the procedure of providing a guide to a hydrogen filling station, which allows the hydrogen fuel vehicle to occupy a hydrogen fuel dispenser linked with a hydrogen tank having reference pressure, at a time point when the hydrogen fuel vehicle having the vehicle terminal 10 arrives, depending on the guide request of the vehicle terminal 10.

When a plurality of hydrogen filling stations, which allow the hydrogen fuel vehicle to occupy a hydrogen fuel dispenser linked with a hydrogen tank having reference pressure, are provided, the controller 24 may provide a guide to a hydrogen filling station showing the minimum filling time. In this case, the controller 24 may receive pressure of the fuel tank from the vehicle terminal 10, and may calculate the filling time based on the current pressure of the hydrogen tank, which is included in the status information on the hydrogen fuel dispenser, and the received pressure of the fuel tank. In this case, the controller 24 may calculate the filling time, based on the current pressure of the hydrogen tank and the pressure of the fuel tank, at the time point when the hydrogen fuel vehicle having the vehicle terminal 10 arrives.

The controller 24 may perform various control operations in the procedure of providing a guide to a hydrogen filling station, which is positioned within the drivable distance of the hydrogen fuel vehicle, of the hydrogen filling stations, which allow the hydrogen fuel vehicle to occupy a hydrogen fuel dispenser linked with a hydrogen tank having reference pressure, at a time point when the hydrogen fuel vehicle having the vehicle terminal 10 arrives, depending on the guide request of the vehicle terminal 10.

The controller 24 may perform various control operations required in the procedure of providing a guide to a hydrogen filling station, which has a hydrogen fuel dispenser linked with a hydrogen tank having pressure higher than the pressure of the fuel tank provided in the hydrogen fuel vehicle, of the hydrogen filling stations, which allow the hydrogen fuel vehicle to occupy the hydrogen fuel dispenser linked with a hydrogen tank having the reference pressure, at a time point when the hydrogen fuel vehicle having the vehicle terminal 10 arrives, depending on the guide request of the vehicle terminal 10.

The controller 24 may perform various control operations required in the procedure of providing a guide to a hydrogen filling station, which is positioned within the drivable distance of the hydrogen fuel vehicle and has a hydrogen fuel dispenser linked with a hydrogen tank having reference pressure (higher than the pressure of the fuel tank provided in the hydrogen fuel vehicle, of the hydrogen filling stations, which allow the hydrogen fuel vehicle to occupy the hydrogen fuel dispenser linked with a hydrogen tank having the reference pressure, at the time point when the hydrogen fuel vehicle having the vehicle terminal 10 arrives, depending on the guide request of the vehicle terminal 10.

Meanwhile, the controller 24 may perform various control operations required in the procedure of calculating a filling time for each hydrogen filling station, based on the maximum pressure and the current pressure of a hydrogen tank provided in the hydrogen filling station, and the maximum pressure and the current pressure of a fuel tank provided in a hydrogen fuel vehicle, and of providing a guide to a hydrogen filling station having the minimum filling time, depending on the guide request of the vehicle terminal 10.

Figure 3:
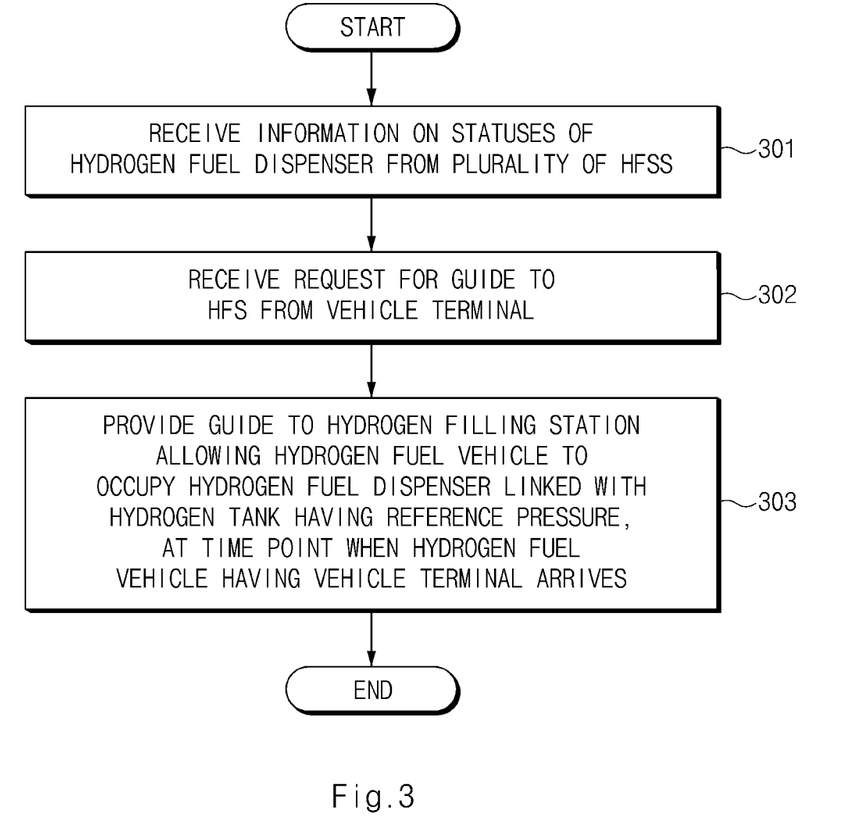
FIG. 3 is a flowchart illustrating a guide method to a hydrogen filling station, according to an embodiment of the present disclosure.

FIG. 3 is a flowchart illustrating a guide method to a hydrogen filling station, according to an embodiment of the present disclosure.

First, the filling station communication device 22 receives information on statuses of hydrogen fuel dispensers, from the hydrogen filling stations 30 and 40 (301).

Thereafter, the vehicle communication device 23 may receive a request for guidance to a hydrogen filling station, from the vehicle terminal 10 (302).

Thereafter, the controller 24 provides a guide to a hydrogen filling station, which allows a hydrogen fuel vehicle to occupy a hydrogen fuel dispenser linked with a hydrogen tank having reference pressure, at a time point when the hydrogen fuel vehicle having the vehicle terminal 24 arrives (303).

Figure 4:
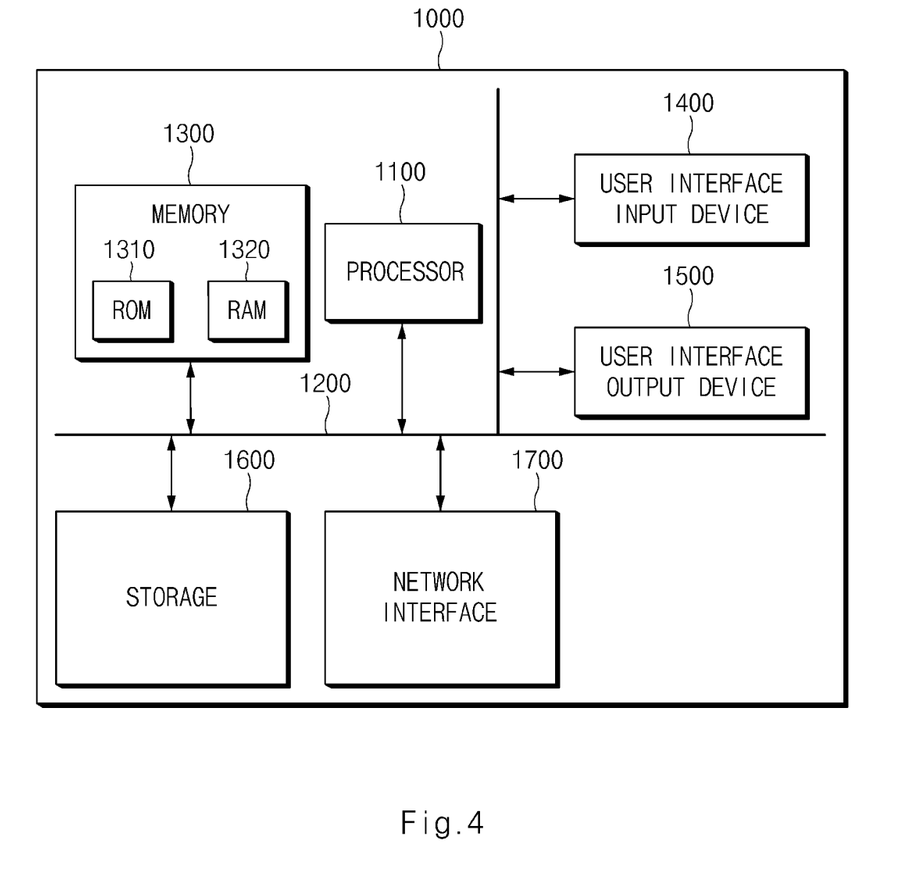
FIG. 4 is a block diagram illustrating a computing system to execute a guide method to a hydrogen filling station, according to an embodiment of the present disclosure.

FIG. 4 is a block diagram illustrating a computing system to execute a guide method to a hydrogen filling station, according to an embodiment of the present disclosure.

Referring to FIG. 4, according to an embodiment of the present disclosure, the guide method to a hydrogen filling station may be implemented through the computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, in the guide system to the hydrogen filling station and the method for the same according to an embodiment of the present disclosure, the guide to the optimal hydrogen filling station to immediately fill hydrogen in a hydrogen fuel vehicle without standby time may be provided by guiding the hydrogen fuel vehicle to the hydrogen filling station positioned within the drivable distance of the hydrogen fuel vehicle and allowing the hydrogen fuel vehicle to occupy the hydrogen fuel dispenser having higher than reference pressure, at the time point when the hydrogen fuel vehicle arrives.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A guide device for selecting from among a plurality of hydrogen filling stations, the guide device comprising:
   a first communication device including a transmitter and a receiver and configured to receive information on a status of a hydrogen fuel dispenser from each of the plurality of hydrogen filling stations in real time, respectively;
   wherein the status comprises a current pressure of a hydrogen tank linked with a hydrogen fuel dispenser;
   a second communication device including a transmitter and a receiver and configured to receive a request for guidance to one of the hydrogen filling stations, from a vehicle terminal; and
   a controller including a processor configured to:
      receive, from the first communication device, the current pressure of a hydrogen tank linked with a hydrogen fuel dispenser of each of the plurality of hydrogen filling stations; and
      guide a hydrogen fuel vehicle having the vehicle terminal to a selected one of the plurality of hydrogen filling stations including a hydrogen fuel dispenser linked with a hydrogen tank having a reference pressure, at a time point when the hydrogen fuel vehicle arrives.

2. The guide device of claim 1, wherein the controller is configured to:
   provide a guide to a hydrogen filling station having a minimum filling time, among the plurality of hydrogen filling stations, which allow the hydrogen fuel vehicle to occupy the hydrogen fuel dispenser having the reference pressure.

3. The guide device of claim 2, wherein the controller is configured to:
   receive pressure of a fuel tank from the vehicle terminal through the second communication device; and
   calculate filling time based on current pressure, which is included in the information on the status of the hydrogen fuel dispenser, of a hydrogen tank and the received pressure of the fuel tank.

4. The guide device of claim 1, wherein the information on the status of the hydrogen fuel dispenser further includes:
   at least one of maximum pressure of a hydrogen tank, a current status being a hydrogen-filling status, a status of boosting pressure of the hydrogen tank, or a hydrogen filling standby status of the hydrogen tank, expected time required until hydrogen is fully filled, expected pressure of the hydrogen tank after the hydrogen is fully filled, or expected time required to boost the pressure of the hydrogen tank to the reference pressure after the hydrogen is fully filled in the hydrogen-filling status, or expected time required to boost the pressure of the hydrogen tank to the reference pressure, or expected pressure of the hydrogen tank after the pressure of the hydrogen tank is completely boosted in the status of boosting pressure of the hydrogen tank.

5. The guide device of claim 1, wherein the controller is configured to:
   provide a guide to a hydrogen filling station, which is positioned within a drivable distance of the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

6. The guide device of claim 1, wherein the controller is configured to:
   provide a guide to a hydrogen filling station, which has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

7. The guide device of claim 1, wherein the controller is configured to:
   provide a guide to a hydrogen filling station, which is positioned within a drivable distance of the hydrogen fuel vehicle and has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

8. A guide method for selecting from among a plurality of hydrogen filling stations, the guide method comprising:
   receiving, by a first communication device including a transmitter and a receiver, information on a status of a hydrogen fuel dispenser from each of the plurality of hydrogen filling stations in real time, respectively;
   wherein the status comprises a current pressure of a hydrogen tank linked with a hydrogen fuel dispenser;
   receiving, by a second communication device including a transmitter and a receiver, a request for guidance to one of the hydrogen filling stations, from a vehicle terminal;
   receiving, by a controller including a processor from the first communication device, the current pressure of a hydrogen tank linked with a hydrogen fuel dispenser of each of the plurality of hydrogen filling stations; and
   guiding, by the controller, a hydrogen fuel vehicle having the vehicle terminal to a selected one of the plurality of hydrogen filling stations including a hydrogen fuel dispenser linked with a hydrogen tank having a reference pressure, at a time point when the hydrogen fuel vehicle arrives.

9. The guide method of claim 8, wherein guiding the hydrogen fuel vehicle includes:
   providing a guide to a hydrogen filling station having a minimum filling time, among the plurality of hydrogen filling stations, which allow the hydrogen fuel vehicle to occupy the hydrogen fuel dispenser having the reference pressure, are provided.

10. The guide method of claim 9, wherein providing the guide to the hydrogen filling station includes:
    receiving, by the second communication device, pressure of a fuel tank from the vehicle terminal; and
    calculating, by the controller, filling time based on current pressure, which is included in the information on the status of the hydrogen fuel dispenser, of a hydrogen tank and the received pressure of the fuel tank.

11. The guide method of claim 8, wherein the information on the status of the hydrogen fuel dispenser further includes:
    at least one of maximum pressure of a hydrogen tank, a current status (a hydrogen-filling status, a status of boosting pressure of the hydrogen tank, or a hydrogen filling standby status) of the hydrogen tank, expected time required until hydrogen is fully filled, expected pressure of a hydrogen tank after the hydrogen is fully filled, or expected time required to boost the pressure of the hydrogen tank to the reference pressure after the hydrogen is fully filled in the hydrogen filling status, or expected time required to boost the pressure of the hydrogen tank to the reference pressure, or expected pressure of the hydrogen tank after the pressure of the hydrogen tank is completely boosted in the status of boosting pressure of the hydrogen tank.

12. The guide method of claim 8, wherein guiding the hydrogen fuel vehicle includes:
    providing a guide to a hydrogen filling station, which is positioned within a drivable distance of the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

13. The guide method of claim 8, wherein guiding the hydrogen fuel vehicle includes:
    providing a guide to a hydrogen filling station, which has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

14. The guide method of claim 8, wherein guiding the hydrogen fuel vehicle includes:
    providing a guide to a hydrogen filling station, which is positioned within a drivable distance of the hydrogen fuel vehicle and has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

15. A guide system for selecting from among a plurality of hydrogen filling stations, the guide system comprising:
- a hydrogen filling station including a processor configured to collect information on a status of a hydrogen fuel dispenser in real time;
- wherein the status comprises a current pressure of a hydrogen tank linked with a hydrogen fuel dispenser;
- a vehicle terminal including a processor configured to requesting guidance to one of the hydrogen filling stations; and
- a guide device including a processor configured to:
  - receive, from the hydrogen filling station, the current pressure of a hydrogen tank linked with a hydrogen fuel dispenser of each of the plurality of hydrogen filling stations; and
  - guide a hydrogen fuel vehicle having the vehicle terminal to a hydrogen filling station of the plurality of hydrogen filling stations including a hydrogen fuel dispenser linked with a hydrogen tank having a reference pressure, at a time point when the hydrogen fuel vehicle arrives.

16. The guide system of claim 15, wherein the guide device is configured to:
- provide a guide to a hydrogen filling station having a minimum filling time, among the plurality of hydrogen filling stations, which allow the hydrogen fuel vehicle to occupy the hydrogen fuel dispenser having the reference pressure, are provided.

17. The guide system of claim 16, wherein the guide device is configured to:
- receive pressure of a fuel tank from the vehicle terminal; and
- calculate filling time based on current pressure, which is included in the information on the status of the hydrogen fuel dispenser, of a hydrogen tank and the received pressure of the fuel tank.

18. The guide system of claim 15, wherein the guide device is configured to:
- provide a guide to a hydrogen filling station, which is positioned within a drivable distance of the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

19. The guide system of claim 15, wherein the guide device is configured to:
- provide a guide to a hydrogen filling station, which has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

20. The guide system of claim 15, wherein the guide device is configured to:
- provide a guide to a hydrogen filling station, which is positioned within a drivable distance of the hydrogen fuel vehicle and has a hydrogen fuel dispenser linked with a hydrogen tank having pressure higher than pressure of a fuel tank provided in the hydrogen fuel vehicle, of the hydrogen filling stations allowing the hydrogen fuel vehicle to occupy the hydrogen fuel dispenser linked with a hydrogen tank having the reference pressure, at the time point when the hydrogen fuel vehicle having the vehicle terminal arrives.

21. A guide device for selecting from among a plurality of hydrogen filling stations, the guide device comprising:
- a first communication device including a transmitter and a receiver and configured to receive maximum pressure and current pressure of a hydrogen tank from each of the plurality of hydrogen filling stations in real time, respectively;
- a second communication device including a transmitter and a receiver and configured to receive maximum pressure and current pressure of a fuel tank from a vehicle terminal; and
- a controller including a processor configured to calculate filling time for each of the plurality of hydrogen filling stations, based on the maximum pressure and the current pressure of the hydrogen tank provided in the each of the hydrogen filling stations and the maximum pressure and the current pressure of the fuel tank, depending on a guide request of the vehicle terminal.

22. The guide device of claim 21, wherein the controller is configured to:
- provide the hydrogen filling station having the minimum filling time, at a time point when a hydrogen fuel vehicle having the vehicle terminal arrives.

* * * * *